United States Patent [19]

Morgan et al.

[11] 3,718,490
[45] Feb. 27, 1973

[54] PROCESS FOR PURIFICATION OF REFRACTORY METAL NITRIDES
[75] Inventors: Cyril Alfred Morgan, E. Molesey; Scott Gordon Arber, Chessington; Oswald William John Young, Surbiton, all of England
[73] Assignee: United States Borax & Chemical Corporation, Los Angeles, Calif.
[22] Filed: Dec. 9, 1970
[21] Appl. No.: 96,652

[30] Foreign Application Priority Data
Dec. 16, 1969 Great Britain......................61,357/69

[52] U.S. Cl. ......................106/65, 423/412, 423/290
[51] Int. Cl. .........................C04b 35/58, C01b 21/06
[58] Field of Search ....23/191, 192; 423/412; 106/65

[56] References Cited

UNITED STATES PATENTS
3,436,179    4/1969    Matsuo et al.........................23/192

FOREIGN PATENTS OR APPLICATIONS
870,084      0/1961    Great Britain..........................23/191
1,071,870    0/1967    Great Britain..........................23/191
874,166      0/1961    Great Britain..........................23/191

OTHER PUBLICATIONS

Jacobson, Encyclopedia of Chemical Reactions, vol. 1, p. 671 (Reinhold – 1946)

Primary Examiner—Oscar R. Vertiz
Assistant Examiner—Charles B. Rodman
Attorney—James R. Thornton

[57] ABSTRACT

Carbon is removed from refractory metal nitrides, such as aluminum nitride, by heating the impure nitride with boric oxide in an atmosphere of nitrogen at a temperature of about 1,200°–2050°C. Boron nitride is formed and provides a valuable mixture of boron nitride and refractory metal nitride.

7 Claims, No Drawings

PROCESS FOR PURIFICATION OF REFRACTORY METAL NITRIDES

This invention relates to the improvement of metal nitrides and especially to the removal of carbon from refractory metal nitrides.

It is known to remove carbon from carbon-contaminated nitrides such as aluminum nitride by roasting the nitride in oxygen at a temperature of about 600°–800°C. However, there is the possibility of partial oxidation of aluminum nitride under these conditions.

According to the present invention, a refractory metal nitride containing up to about 30 percent by weight of carbon is reacted with boric oxide in an atmosphere of nitrogen at a temperature of about 1,200°–2,050°C. Removal of carbon takes place according to the equation $$B_2O_3 + 3C + N_2 \rightarrow 2BN + 3CO.$$

Thus, the quantity of boric oxide should be sufficient to react with all the carbon present. The boric oxide may be present in the form of $B_2O_3$ added as such, or may be derived from a boron compound which yields $B_2O_3$ during the reaction, such as boric acid. Aluminum nitride is the preferred refractory metal nitride according to the present process.

The final product will therefore contain boron nitride as well as the refractory metal nitride. This is advantageous for many industrial processes, particularly those for the manufacture of vacuum evaporator bars, which require the joint presence of boron nitride and aluminum nitride during the process.

Thus, this process provides a single reaction which both removes carbon and adds boron nitride to the product. Another advantage of the process is that, in the case of aluminum nitride, the resultant product contains very little residual $Al_2O_3$. During the initial reaction stage alumina is carbothermically reduced according to the equation $$Al_2O_3 + 3C + N_2 \rightarrow 3CO + 2AlN.$$

A content of carbon of about 4 percent in the aluminum nitride is usually adequate to reduce un-nitrided alumina. Extra carbon may be added to increase the amount of boron nitride in the product. A larger amount of carbon may be added when it is desired to remove all unreacted alumina. This high excess of carbon is then removed by reaction with boric oxide.

In the practice of this invention impure refractory metal nitride such as aluminum nitride (containing up to about 30 percent carbon) and boric oxide (or a compound which will yield boric oxide under the conditions of the reaction) are ground and mixed together. A small amount of paraffin preferably is used as a binder. This mixture is then compacted and fired in an atmosphere of nitrogen at a temperature of about 1,600°–1,900°C.

The following examples illustrate the invention

EXAMPLES 1 – 4

Mixtures of impure aluminum nitride, boric oxide, and paraffin in the ratios shown in Table 1, were compacted by hydraulic pressure. Analysis of the starting material aluminum nitride was as shown in Table 2. The compacts were placed in a vertical furnace and heated while a stream of nitrogen was passed upwards through the mixture. Conditions of the experiment are set out in Table 3.

The weight of product obtained in each case, together with the analytical data for each product, is given in Table 4.

TABLE 1

Ratios of reactants used (by weight)

| Example | Impure AlN | $B_2O_3$ | Paraffin |
|---|---|---|---|
| 1 | 80.8 | 9.7 | 9.5 |
| 2 | 73.4 | 17.4 | 9.2 |
| 3 | 71 | 24 | 5 |
| 4 | 65 | 29.2 | 5.8 |

TABLE 2

Analyses of starting materials (as % by weight)

| Example | Al | N | C |
|---|---|---|---|
| 1 | 57.2 | 26.6 | 10 |
| 2 | 58.7 | 29.8 | 10.5 |
| 3 | 53.1 | 27.0 | 18 |
| 4 | 48.1 | 24.9 | 26.3 |

TABLE 3

| Ex. | Wt. taken | Heating time and temperature | Type of Furnace | Rate of $N_2$ Flow |
|---|---|---|---|---|
| 1 | 68 g. | 2 hours at 1600°–1900°C. | Vertical graphite resistance | 0.25 l/min. |
| 2 | 6900 g. | 2.5 hours at 1600°–1900°C. | Vertical graphite induction | 14–19 l./min. |
| 3 | 71 g. | 3 hours at 1600°–1900°C. | As in Ex 1. | 0.25 l./min. |
| 4 | 47 g. | 2.25 hours at 1600°–1900°C. | As in Ex 1. | 0.2 l./min. |

TABLE 4

Product Analysis

| Ex. | wt. obtained | Al % by wt. | N % by wt. | B % by wt. | C % by wt. |
|---|---|---|---|---|---|
| 1 | 55 g. | 59.9 | 34.4 | 4 | 0.6 |
| 2 | 5300 g. | 55.1 | 35.9 | 6.4 | 0.25 |
| 3 | 52.1 g. | 50 | 37.5 | 9.6 | 0.3 |
| 4 | 33 g. | 44.9 | 37.5 | 11.9 | 4.5 |

EXAMPLE 5

Boron nitride (15.2 lbs.) containing a total of 6.1 percent free and combined carbon was mixed with boric oxide (7.3 lbs.) and compacted. The compacted material (18.6 lbs.) was heated in an atmosphere of nitrogen for 3 hours at a temperature of 1,650° – 2,000°C. The resultant product gave an analysis N = 55.7%
B = 43.4%
C = 0.12%
Theoretical for BN = 44% B; 56% N

EXAMPLE 6

Titanium nitride (100 g.) containing 3.5 percent free and combined carbon was mixed with boric oxide (15 g.) and compacted. The compacted material was heated in a nitrogen atmosphere for 3 hours at a temperature of 1,600° – 2,000°C. The resultant product analyzed as follows:

Ti = 74.6%
N = 19.1%
B = 1.7%
C = 0.2%

The process can be used to remove carbon from other metal nitrides, such as the nitrides of zirconium, vanadium, tantalum, hafnium, and niobium, especially those obtained by a carbothermic process.

Various changes and modifications of the invention can be made and, to the extent that such variations incorporate the spirit of this invention, they are intended to be included within the scope of the appended claims.

1. The process for removing carbon from impure aluminum nitride containing residual alumina which comprises compacting a mixture of said impure aluminum nitride, boric oxide and paraffin, and heating the compacted mixture in an atmosphere of nitrogen at a temperature of about 1,600° – 1,900°C. for a period of time sufficient to convert said boric oxide to boron nitride and said residual alumina to aluminum nitride.

2. The process according to claim 1 in which said impure aluminum nitride contains up to about 30 percent by weight of carbon.

3. The process according to claim 1 in which the boric oxide is present in an amount sufficient to react with all the carbon present according to the equation $$B_2O_3 + 3C + N_2 \rightarrow 2BN + 3CO.$$

4. The process according to claim 1 in which said boric oxide is derived from boric acid during the reaction.

5. The process for removing carbon from impure aluminum nitride containing up to about 30 percent by weight of carbon which comprises heating said impure aluminum nitride with boric oxide in the presence of nitrogen at a temperature of from about 1,200° to 2,050°C., thereby converting said boric oxide to boron nitride and providing a mixture of nitrides of aluminum and boron.

6. The process according to claim 5 in which said aluminum nitride contains alumina which is carbothermically reduced to aluminum nitride.

7. The process according to claim 5 in which said boric oxide is derived from boric acid during the reaction.

* * * * *